US007464321B2

(12) United States Patent
Benhase et al.

(10) Patent No.: US 7,464,321 B2
(45) Date of Patent: Dec. 9, 2008

(54) APPARATUS AND METHOD TO TRANSFER INFORMATION FROM A FIRST INFORMATION STORAGE AND RETRIEVAL SYSTEM TO A SECOND INFORMATION STORAGE AND RETRIEVAL SYSTEM

(75) Inventors: Michael T. Benhase, Tucson, AZ (US); James Chien-Chiung Chen, Tucson, AZ (US); Chung Man Fung, San Francisco, CA (US); Matthew J. Kalos, Tucson, AZ (US); Patricia Ching Lu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 10/993,778

(22) Filed: Nov. 18, 2004

(65) Prior Publication Data

US 2006/0104191 A1    May 18, 2006

(51) Int. Cl.
*G11C 29/00* (2006.01)
(52) U.S. Cl. .................................. 714/766; 369/13.08
(58) Field of Classification Search ................. 714/766; 369/13.08
See application file for complete search history.

(56) References Cited

U.S. PATENT DOCUMENTS 4,667,258 A * 5/1987 Johnson et al. .......... 360/99.02
4,680,653 A * 7/1987 Ng et al. ..................... 360/72.2
6,263,148 B1 * 7/2001 Hori et al. ...................... 386/46
6,658,201 B1 * 12/2003 Rebalski ....................... 386/98
6,687,768 B2   2/2004 Horikomi et al.
6,694,392 B1   2/2004 Haren
6,718,352 B1 * 4/2004 Dang et al. .................. 707/205
7,054,260 B2 * 5/2006 Rilum et al. ............. 369/275.4
7,299,401 B2 * 11/2007 Fukuda ........................ 714/769
2003/0070014 A1   4/2003 Haren

FOREIGN PATENT DOCUMENTS

| JP | 7036626 A  | 2/1994 |
| JP | 8077371 A  | 3/1996 |
| JP | 10011223 A | 1/1998 |

* cited by examiner

*Primary Examiner*—Mujtaba K Chaudry
(74) *Attorney, Agent, or Firm*—Dale F. Regelman; Quarles & Brady LLP

(57) ABSTRACT

A method is disclosed to transfer information from a first information storage and retrieval system to a second information storage and retrieval system. The method provides a first information storage and retrieval system comprising a first track size and a plurality of first tracks, and a second information storage and retrieval system comprising a second track size and a plurality of second tracks. The method determines if the first track size is greater than the second track size. If the method determines that the first track size is greater than said second track size, then the method sets a ratio (R) equal to the first track size divided by the second track size, provides the (i)th first track from the first information storage and retrieval system to the second information storage and retrieval system, provides (R) second tracks, and maps the (i)th first track onto the (R) second tracks.

27 Claims, 11 Drawing Sheets

APPARATUS AND METHOD TO TRANSFER INFORMATION FROM A FIRST INFORMATION STORAGE AND RETRIEVAL SYSTEM TO A SECOND INFORMATION STORAGE AND RETRIEVAL SYSTEM

FIELD OF THE INVENTION

This invention relates to an apparatus and method to transfer information from a first information storage and retrieval system to a second information storage and retrieval system.

BACKGROUND OF THE INVENTION

Many data processing systems require a large amount of data storage, for use in efficiently accessing, modifying, and re-storing data. Data storage is typically separated into several different levels, each level exhibiting a different data access time or data storage cost. A first, or highest level of data storage involves electronic memory, usually dynamic or static random access memory (DRAM or SRAM). Electronic memories take the form of semiconductor integrated circuits where millions of bytes of data can be stored on each circuit, with access to such bytes of data measured in nanoseconds. The electronic memory provides the fastest access to data since access is entirely electronic.

A second level of data storage usually involves direct access storage devices (DASD). DASD storage, for example, includes magnetic and/or optical disks. Data bits are stored as micrometer-sized or less magnetically or optically altered spots on a disk surface, representing the "ones" and "zeros" that comprise the binary value of the data bits. Magnetic DASD includes one or more disks that are coated with remnant magnetic material. DASDs can store gigabytes of data, and the access to such data is typically measured in milliseconds, i.e. orders of magnitudes slower than electronic memory.

Having a backup data copy is mandatory for many businesses for which data loss would be catastrophic. The time required to recover lost data is also an important recovery consideration. With tape or library backup, primary data is periodically backed-up by making a copy on tape or library storage at a remote storage location.

What is needed is a method to transfer information from a first information storage and retrieval system comprising a first track size and a plurality of first tracks to a second information storage and retrieval system comprising a second track size and a plurality of second tracks.

SUMMARY OF THE INVENTION

Applicants' invention includes an apparatus and method to transfer information from a first information storage and retrieval system to a second information storage and retrieval system. The method provides a first information storage and retrieval system comprising a first track size and a plurality of first tracks, and a second information storage and retrieval system comprising a second track size and a plurality of second tracks. The method determines if the first track size is greater than the second track size. If the method determines that the first track size is greater than said second track size, then the method sets a ratio (R) equal to the first track size divided by the second track size, provides the (i)th first track from the first information storage and retrieval system to the second information storage and retrieval system, provides (R) second tracks, and maps the (i)th first track onto the (R) second tracks sets a track ID for a (i)th second track equal to (i) * (R), and sets a track ID for a (j+x)th second track equal to [(i) * (R)]+x.

BRIEF DESCRIPTION OF THE DRAWINGS

The invention will be better understood from a reading of the following detailed description taken in conjunction with the drawings in which like reference designators are used to designate like elements, and in which:

FIGS. 3B and 3C, is a flow chart summarizing certain additional steps of Applicants' method;

FIGS. 3D and 3E, is a flow chart summarizing certain additional steps of Applicants' method;

DETAILED DESCRIPTION OF THE PREFERRED EMBODIMENTS

Referring to the illustrations, like numerals correspond to like parts depicted in the Figures. The invention will be described as embodied in a system comprising multiple information storage and retrieval systems. In certain embodiments, one or more of Applicants' information storage and retrieval systems comprises two or more subsystems sometimes referred to as "clusters." In certain embodiments, one or more of Applicants' information and storage retrieval systems do not include individual clusters.

Figure 1:
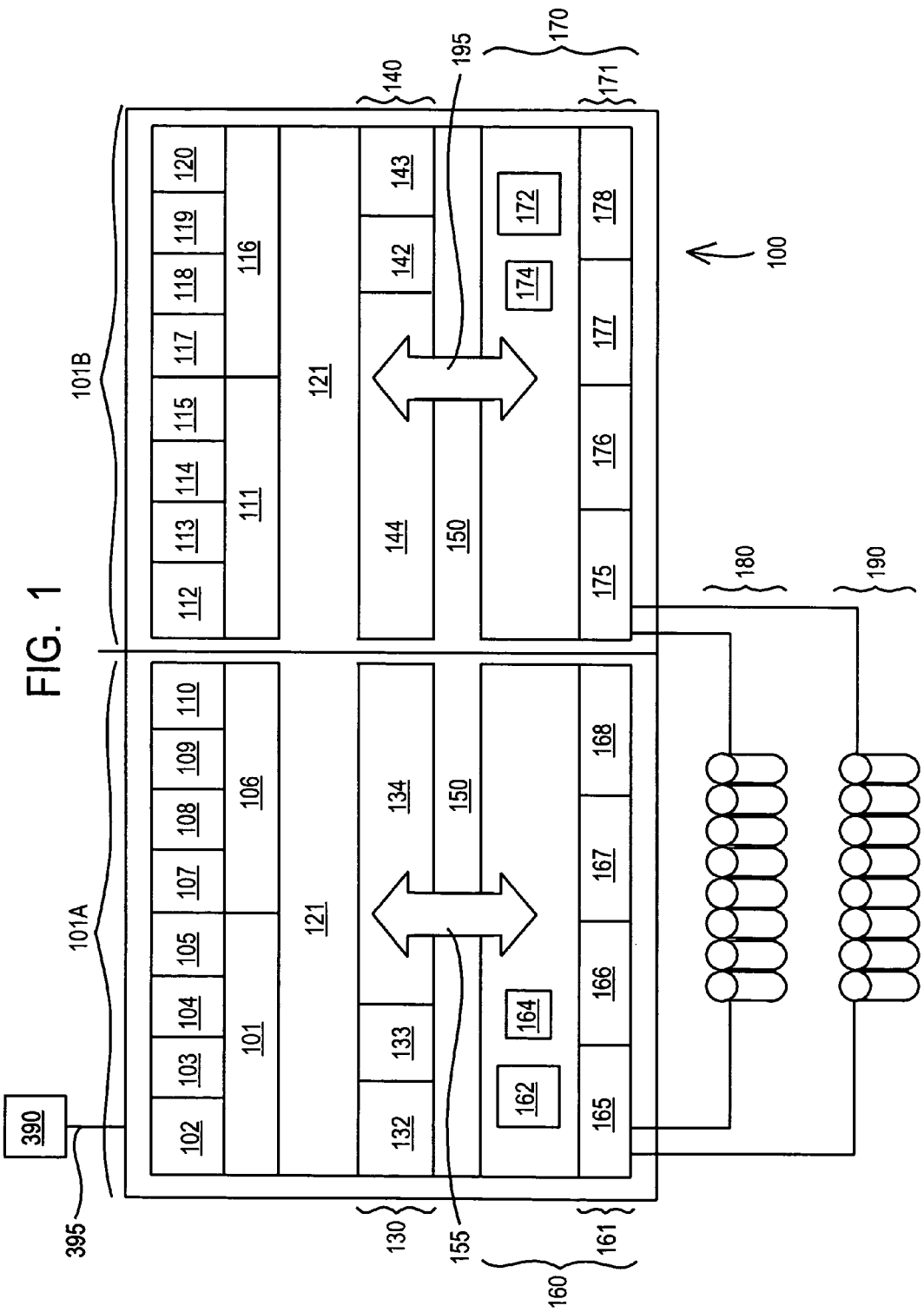
FIG. 1 is a block diagram showing the components of Applicants' information storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group; LINUX is a registered trademark owned by Linus Torvalds.) Host computer comprises processor 392 (FIG. 2) and memory 396 (FIG. 2).

Figure 2:
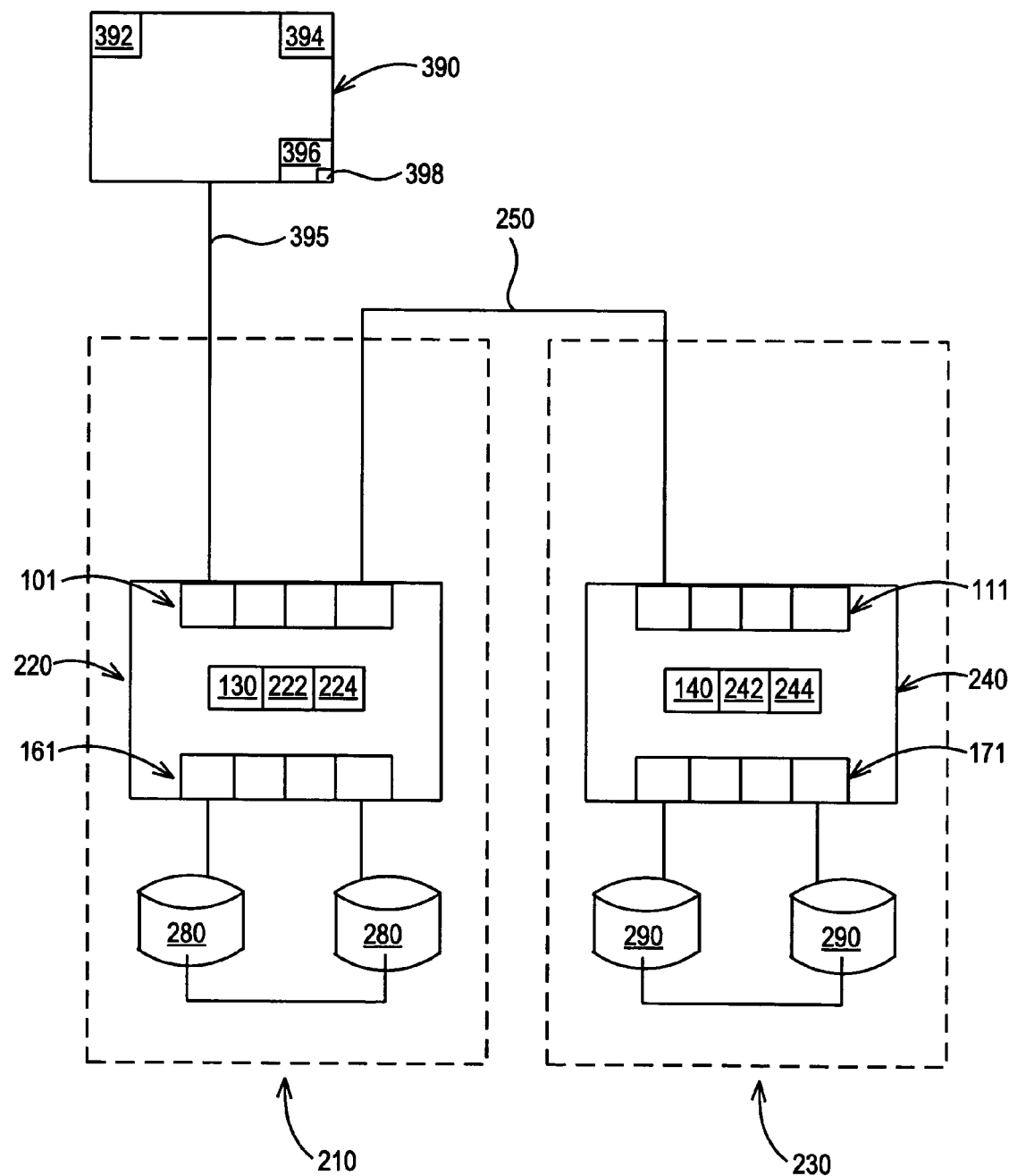
FIG. 2 is a block diagram showing Applicants' data processing system.

In certain embodiments, host computer 390 further includes a storage management program 394 (FIG. 2). The storage management program 394 in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a plurality of host adapters 102-105, 107-110, 112-115, and 117-120, disposed in four host bays 101, 106, 111, and 116. Each host adapter is connected to both subsystems through one or more Common Platform Interconnect buses 121 and 150 such that each subsystem can handle I/O from any host adapter. Internal buses in each subsystem are connected via a Remote I/O bridge 155/195 between the processor portions 130/140 and I/O portions 160/170, respectively.

In other embodiments, Applicants' information storage and retrieval system includes fewer than 16 host adapters. Regardless of the number of host adapters disposed in any embodiments of Applicants' system, each of those host adapters comprises a shared resource that has equal access to both central processing/cache elements 130 and 140. Each host adapter may comprise one or more Fibre Channel ports, one or more FICON ports, one or more ESCON ports, or one or more SCSI ports.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters, such as device adapters 165, 166, 167, and 168. I/O portion 160 further comprises nonvolatile storage ("NVS") 162 and battery backup 164 for NVS 162.

I/O portion 170 comprises a plurality of device adapters, such as device adapters 175, 176, 177, and 178. I/O portion 170 further comprises NVS 172 and battery backup 174 for NVS 172.

In certain embodiments of Applicants' system, one or more host adapters shown in FIG. 1 in host bay 101, processor/cache portion 130, and one or more device adapters 161, are packaged together on a single card disposed in Applicants' information storage and retrieval system. Similarly, in certain embodiments, one or more host adapters shown in FIG. 1 in host bay 111, processor/cache portion 140, and one or more device adapters 171, are disposed on another card disposed in Applicants' information storage and retrieval system. In these embodiments, Applicants' system 100 includes two cards interconnected with a plurality of data storage devices.

In the illustrated embodiment of FIG. 1, sixteen data storage devices are organized into two arrays, namely array 180 and array 190. The illustrated embodiment of FIG. 1 shows two storage device arrays. In other embodiments, Applicants' system includes a single storage device array. In still other embodiments, Applicants' information storage and retrieval system includes more than two storage device arrays. Each storage array appears to a host computer as one or more logical devices.

In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

Applicants' data processing system includes one or more host computers capable of communicating with a first information storage and retrieval system, wherein that first information storage and retrieval system comprises a first track size, and a second information storage and retrieval system capable of communicating with the first information storage and retrieval system, wherein that second information storage and retrieval system comprises a second track size. In certain embodiments of Applicants' apparatus and method, the first track size is greater than the second track size. In other embodiments, the first track size is smaller than the second track size. In certain embodiments, the first track size is selected from the group consisting of 32 sectors, 64 sectors, and 128 sectors. In certain embodiments, the second track size is selected from the group consisting of 32 sectors, 64 sectors, and 128 sectors.

Referring now to FIG. 2, host computer 390 is capable of communication with information storage and retrieval system 210 via communication link 395. Information storage and retrieval system 210 is capable of communicating with information storage and retrieval system 230 via communication link 250.

Information storage and retrieval system 210 comprises controller 220. In the illustrated embodiment of FIG. 2, controller 220 comprises one or more host adapters 101 (FIG. 1), one or more device adapters 161 (FIG. 1), controller portion 130 (FIG. 1), instructions 222, data queue 224, and a plurality of data storage devices 280. Information storage and retrieval system 230 comprises controller 240. In the illustrated embodiment of FIG. 2, controller 240 comprises one or more host adapters 111 (FIG. 1), one or more device adapters 171 (FIG. 1), controller portion 140 (FIG. 1), instructions 242, data queue 244, and a plurality of data storage devices 290.

Applicants' invention includes a method to copy one or more first tracks, having a first track size, where those one or more first tracks are written to one or more data storage devices disposed in a first information storage and retrieval system, such as system 210, to one or more second tracks, having a second track size, where those one or more second tracks are written to one or more data storage devices disposed in a second information storage and retrieval system, such as system 230 (FIG. 2).

Customer workloads comprising I/O requests from one or more host computers to an information storage and retrieval system typically fall into one of two groups which include transaction based workloads comprising small transfer lengths, and sequential base workloads comprising large transfer lengths. Information storage and retrieval systems implement cache directory structures which, inter alia, define a track size used for cache data look-up and space allocation. Such a track size is selected to expedite the handling of both transaction base workloads and sequential base workloads.

Generally, the track size used by an information storage and retrieval system is set either by the manufacturer or by the operator at the time of system startup. Information storage and retrieval systems established at differing times may use different track sizes.

Figure 3A:
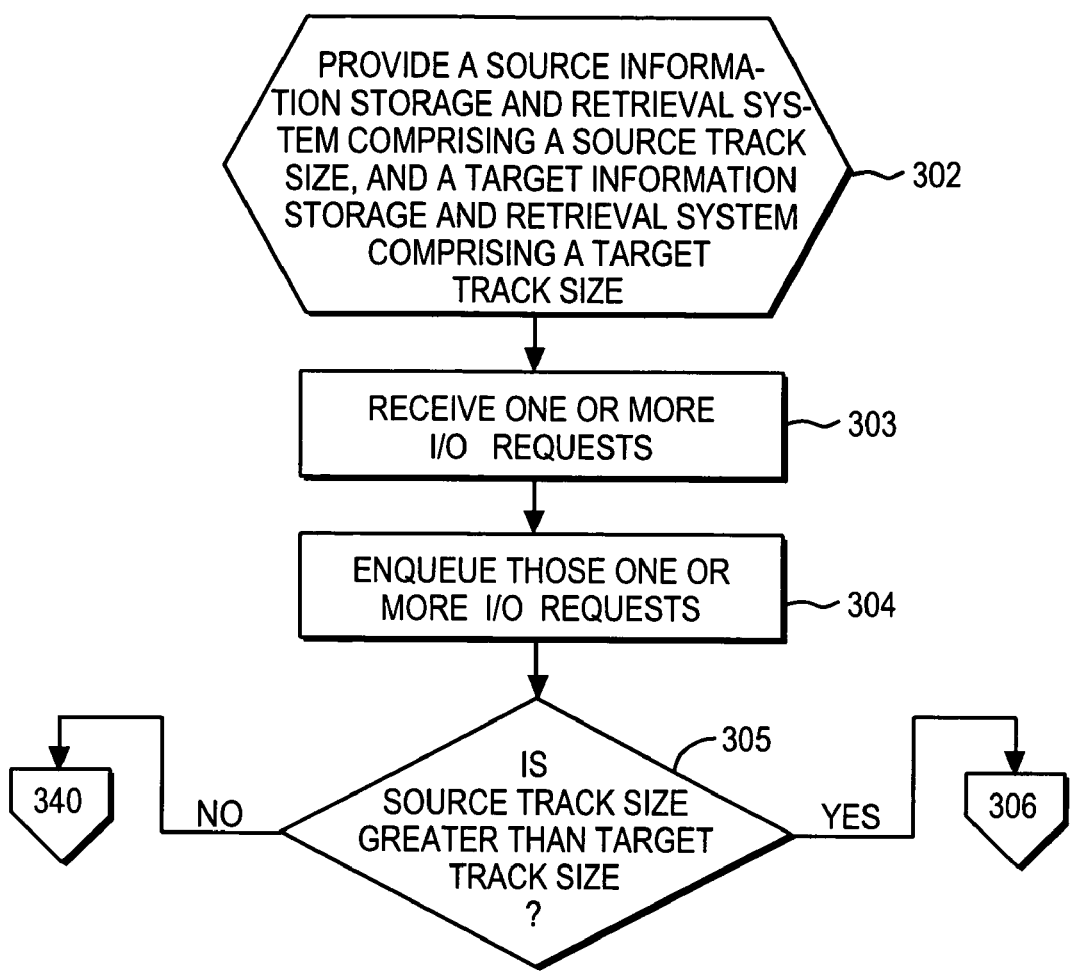
FIG. 3A is a flow chart summarizing the initial steps of Applicants' method.

Referring now to FIG. 3A, in step 302 Applicants' method supplies one or more first tracks, having a first track size, where those one or more first tracks are written to one or more data storage devices disposed in a first, i.e. a source, information storage and retrieval system, such as system 210. Step 302 further comprises supplying one or more second tracks, having a second track size, where those one or more second tracks are written to one or more data storage devices disposed in a second information storage and retrieval system, such as system 230 (FIG. 2).

In step 303, Applicants' source information storage and retrieval system, i.e. the first system, receives one or more I/O requests and generates a plurality of first tracks from those one or more I/O requests. In certain embodiments, step 303 is performed by a controller disposed in the source system, such as controller 220 (FIG. 2). In certain embodiments, step 304 is performed by a controller disposed in the target system, such as controller 240 (FIG. 2). In certain embodiments, step 304 is performed by a processor disposed in a host computer, such as processor 392 (FIG. 2).

Applicants' method transitions from step 303 to step 304 wherein the method enqueues each of the one or more I/O requests received in step 303. In certain embodiments, step 304 is performed by a controller disposed in the source system, such as controller 220 (FIG. 2). In certain embodiments, step 304 is performed by a controller disposed in the target system, such as controller 240 (FIG. 2). In certain embodiments, step 304 is performed by a controller disposed in a host computer, such as controller 392 (FIG. 2).

In step 305, Applicants' method determines if the source track size, i.e. the first track size, is greater than the target track size, i.e. the second track size. In certain embodiments, step 305 is performed by a controller disposed in the source system, such as controller 220 (FIG. 2). In certain embodiments, step 305 is performed by a controller disposed in the target system, such as controller 240 (FIG. 2). In certain embodiments, step 305 is performed by a controller disposed in a host computer, such as controller 392 (FIG. 2).

Figure 3B:
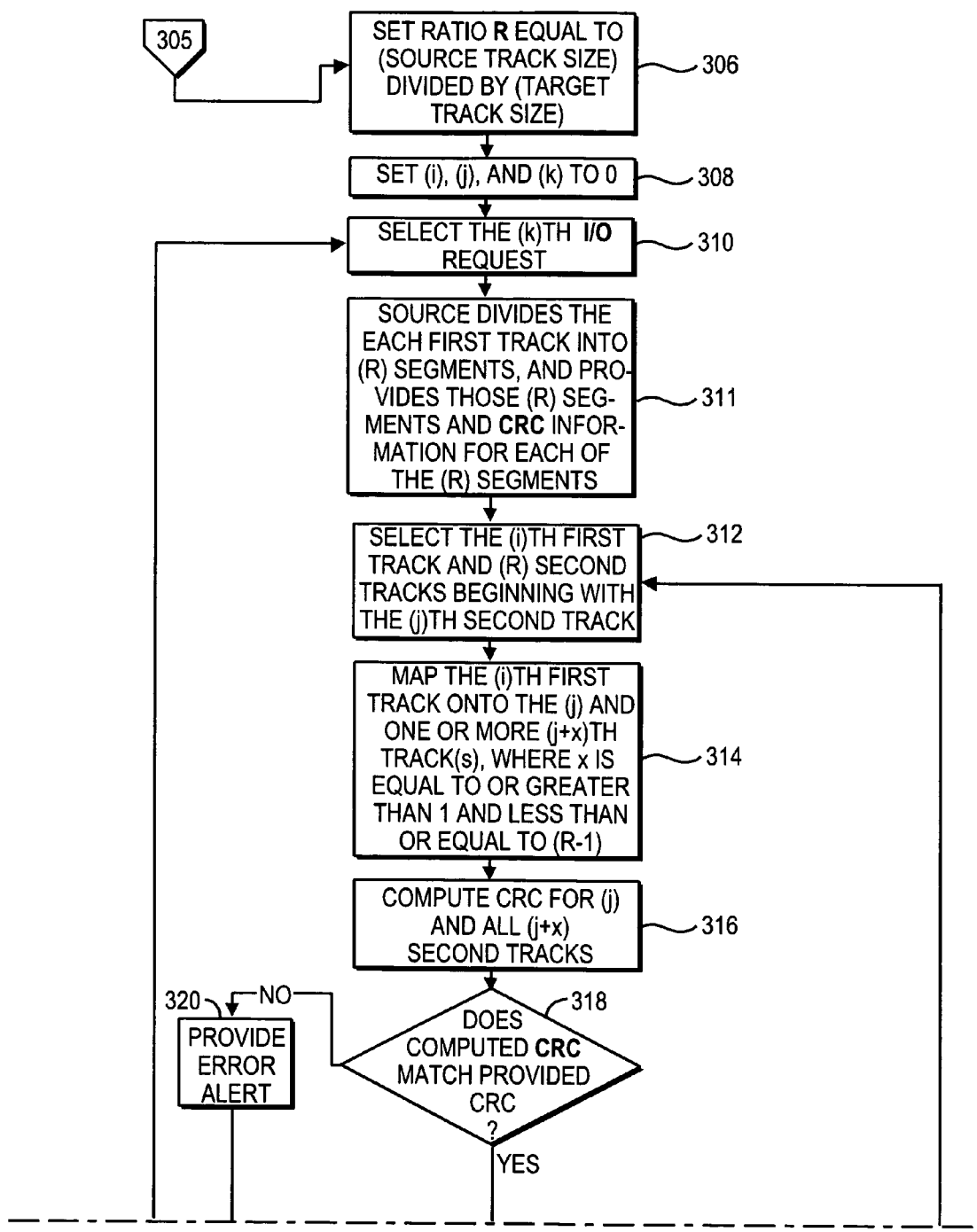
FIG. 3B, which includes
Figure 3C:
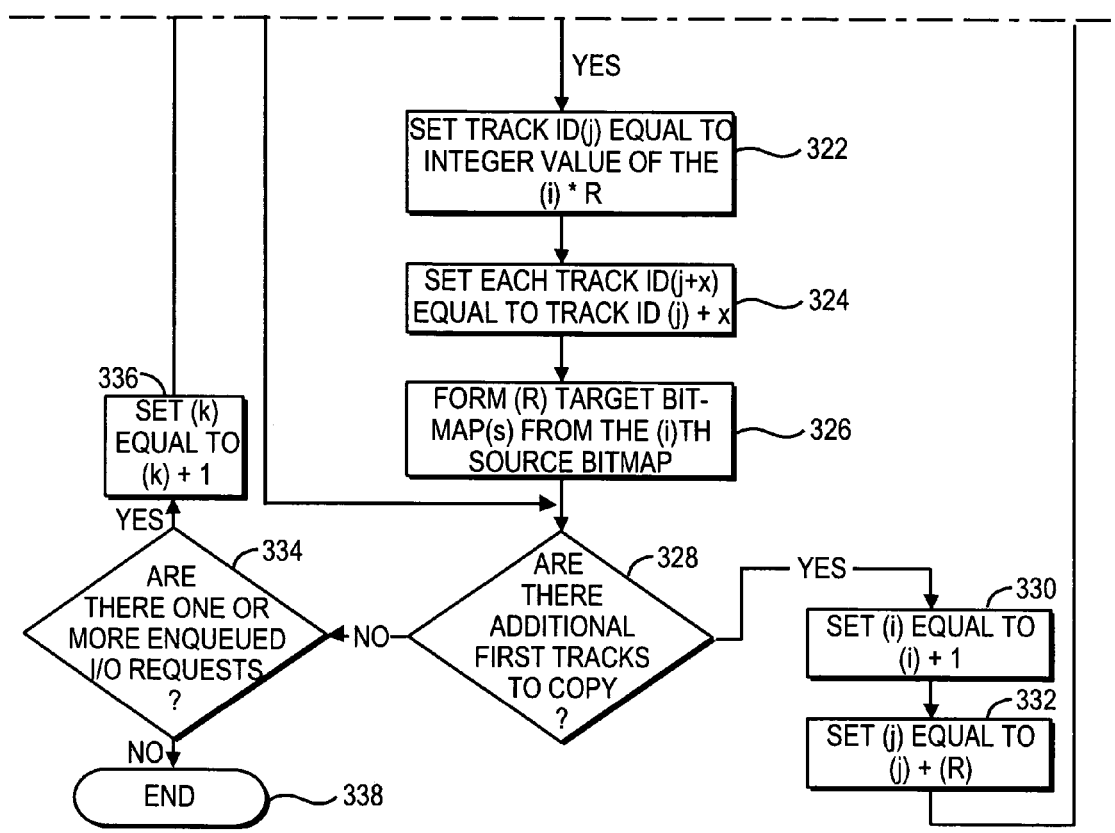
Figure 3D:
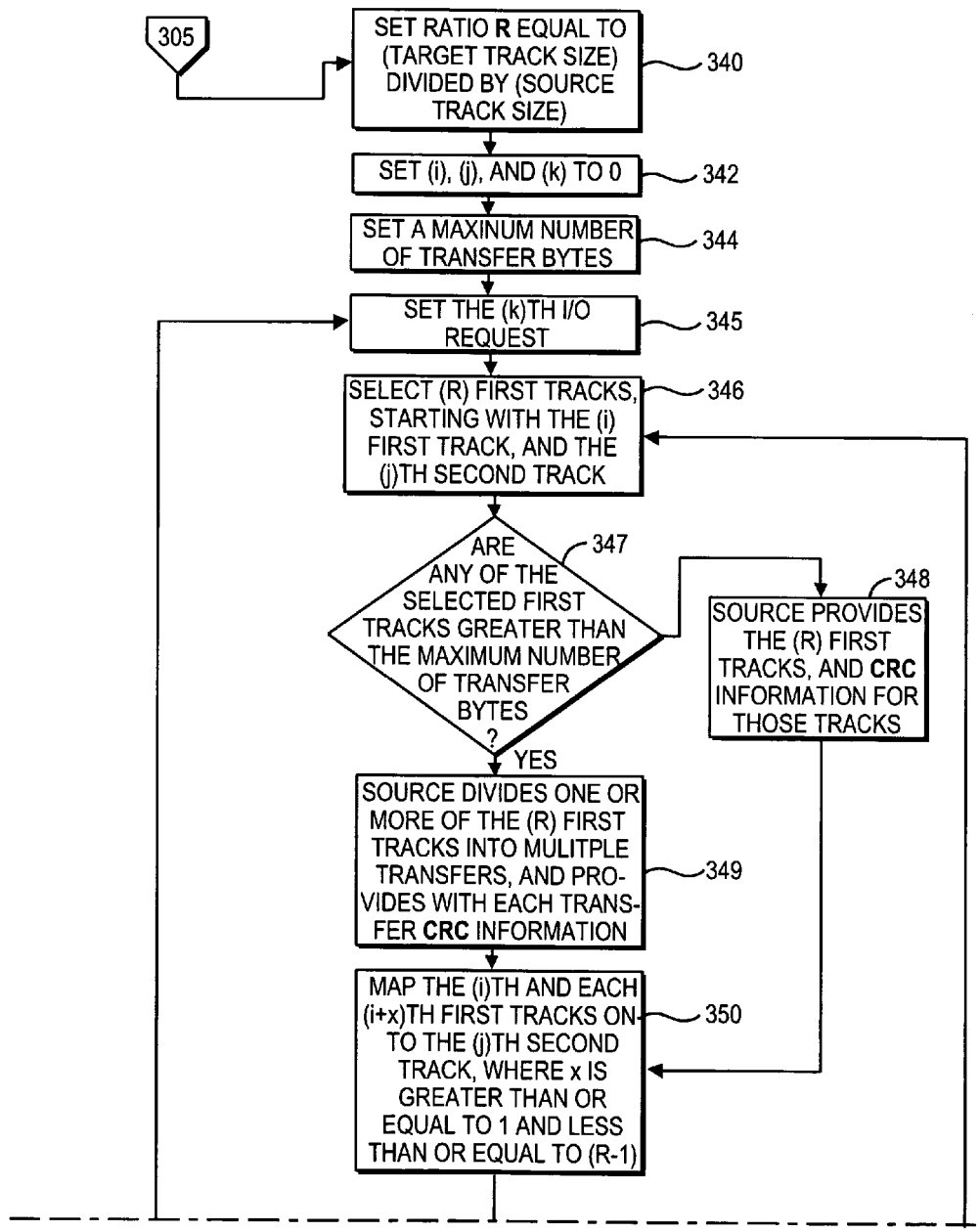
FIG. 3D, which includes

If Applicants' method determines in step 305 that the source track size is greater than the target track size, then the method transitions from step 305 to step 306 (FIG. 3B). Alternatively, if Applicants' method determines in step 305 that the source track size is not greater than the target track size, then the method transitions from step 305 to step 340 (FIG. 3D).

Referring now to FIG. 3B, in step 306 Applicants' method sets a ratio R equal to the source track size divided by the target track size. In certain embodiments, step 306 is performed by a controller disposed in the source system, such as controller 220 (FIG. 2). In certain embodiments, step 306 is performed by a controller disposed in the target system, such as controller 240 (FIG. 2). In certain embodiments, step 306 is performed by a controller disposed in a host computer, such as controller 392 (FIG. 2).

For example, if the source track size is 128 sectors, and the target track size is 64 sectors, then R is set in step 306 to 2. If the source track size is 128 sectors, and the target track size is 32 sectors, then R is set in step 306 to 4. In step 308, Applicants' method initializes certain variables (i), (j), and (k) to 0. In certain embodiments, step 308 is performed by a controller disposed in the source system, such as controller 220 (FIG. 2). In certain embodiments, step 308 is performed by a controller disposed in the target system, such as controller 240 (FIG. 2). In certain embodiments, step 308 is performed by a controller disposed in a host computer, such as controller 392 (FIG. 2).

In step 310, Applicants' method selects the (k)th I/O request, where that (k)th I/O request comprises one or more first tracks, and wherein that (k)th I/O request was received prior to each of the other enqueued I/O requests. As a general matter, Applicants' source information storage and retrieval system enqueues, in a data queue such as queue 222, I/O requests received from one or more host computers. When copying such I/O requests to a secondary storage system, i.e. the target system, the source system provides those I/O requests to the target in the order those requests were received by the source. In certain embodiments, step 310 is performed by a controller disposed in the source system, such as controller 220 (FIG. 2). In certain embodiments, step 310 is performed by a controller disposed in the target system, such as controller 240 (FIG. 2). In certain embodiments, step 310 is performed by a controller disposed in a host computer, such as controller 392 (FIG. 2).

In step 311, Applicants' method splits each first track comprising the selected I/O request into (R) segments, and provides to the target system those (R) segments, Cyclic Redundancy Check ("CRC") information for each of those (R) segments, and a source bitmap for each source track. In certain embodiments, step 311 is performed by a controller disposed in the source system, such as controller 220 (FIG. 2). In certain embodiments, step 311 is performed by a controller disposed in the target system, such as controller 240 (FIG. 2). In certain embodiments, step 311 is performed by a controller disposed in a host computer, such as controller 392 (FIG. 2).

In step 312, Applicants' method selects the (i)th first track from the selected I/O request, and selects (R) second tracks beginning with the (j)th second track. In certain embodiments, step 312 is performed by a controller disposed in the source system, such as controller 220 (FIG. 2). In certain embodiments, step 312 is performed by a controller disposed in the target system, such as controller 240 (FIG. 2). In certain embodiments, step 312 is performed by a controller disposed in a host computer, such as controller 392 (FIG. 2).

Figure 4:
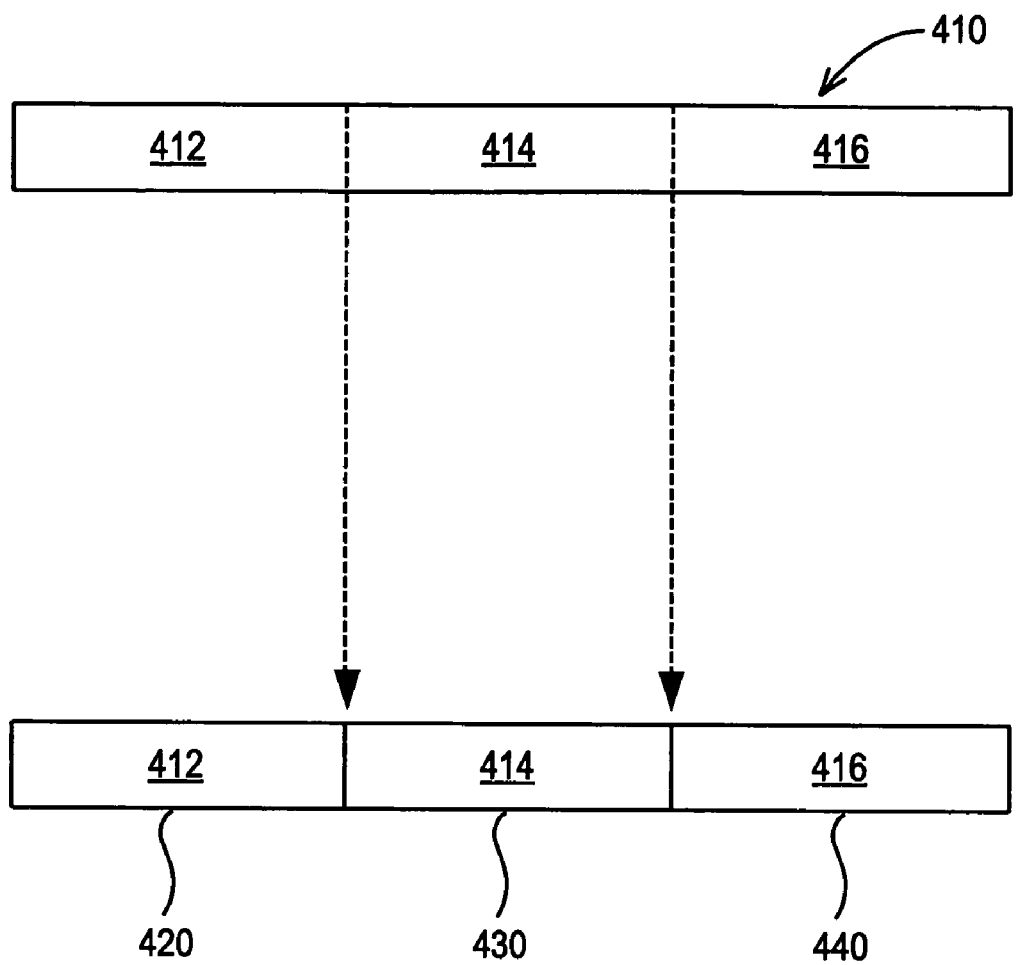
FIG. 4 is a block diagram showing one source track being mapped into three target tracks.

In step 314, the target system maps the (i)th first track onto two or more second tracks. For example, if R is set to 2 in step 306, then in step 314 the method maps the (i)th first track onto the (j)th and the (j+1)th second tracks. On the other hand, if R is set to 3 in step 306, then in step 314 the method maps the (i)th first track onto the (j)th, the (j+1)th, and the (j+2)th second tracks. Referring now to FIG. 4 wherein (R) is 3, first track 410 includes first sectors 412, second sectors 414, and third sectors 416. In step 306, Applicants' method maps first track 410 onto second tracks 420, 430, and 440, such that first sectors 412 are written to target track 420, and such that second sectors 414 are written to target track 430, and such that third sectors 414 are written to target track 440.

In step 316, Applicants' method calculates CRC information for each of the second tracks written in step 314. In the illustrated embodiment of FIG. 4, step 316 comprises calculating CRC information for second tracks 420, 430, and 440. In certain embodiments, step 316 is performed by a controller disposed in the source system, such as controller 220 (FIG. 2). In certain embodiments, step 316 is performed by a controller disposed in the target system, such as controller 240 (FIG. 2). In certain embodiments, step 316 is performed by a controller disposed in a host computer, such as controller 392 (FIG. 2).

In step 318, Applicants' method determines if the computed CRC information of step 316 matches the provided CRC information of step 312. In certain embodiments, step 318 is performed by a controller disposed in the source system, such as controller 220 (FIG. 2). In certain embodiments, step 318 is performed by a controller disposed in the target system, such as controller 240 (FIG. 2). In certain embodiments, step 318 is performed by a controller disposed in a host computer, such as controller 392 (FIG. 2).

If Applicants' method determines in step 318 that the computed CRC information of step 316 does not match the provided CRC information of step 312, then the method transitions from step 318 to step 320 wherein the method provides an error alert. In certain embodiments, step 320 is performed by a controller disposed in the source system, such as controller 220 (FIG. 2). In certain embodiments, step 320 is performed by a controller disposed in the target system, such as controller 240 (FIG. 2). In certain embodiments, step 320 is performed by a controller disposed in a host computer, such as controller 392 (FIG. 2). Applicants' method transitions from step 320 to step 328 (FIG. 3C).

In certain embodiments, the error alert of step 320 comprises a visual indication. In certain embodiments, the error alert of step 320 comprises a written indication. In certain embodiments, the error alert of step 320 comprises an auditory indication. In certain embodiments, step 320 is performed by a controller disposed in the source system, such as controller 220 (FIG. 2). In certain embodiments, step 320 is performed by a controller disposed in the target system, such as controller 240 (FIG. 2). In certain embodiments, step 320 is performed by a controller disposed in a host computer, such as controller 392 (FIG. 2).

If Applicants' method determines in step 318 that the computed CRC information of step 318 does match the provided CRC information of step 312, then the method transitions from step 318 to step 322 (FIG. 3C), wherein the method set the track ID for the (j)th second track to equal (R) times (i). In certain embodiments, step 322 is performed by a controller disposed in the source system, such as controller 220 (FIG. 2). In certain embodiments, step 322 is performed by a controller disposed in the target system, such as controller 240 (FIG. 2). In certain embodiments, step 322 is performed by a controller disposed in a host computer, such as controller 392 (FIG. 2).

For example, if the (i)th first track has a track ID of 0, then in step 322 the method sets the track ID for the (j)th second track to 0. If the (i)th first track has a track ID of 1, then in step 322 Applicants' sets the track ID for the (j)th second track to 3.

Referring now to FIG. 3C, Applicants' method transitions from step 322 to step 324 wherein the method sets the track ID for the (j+1)th second track to the track ID for the (j)th second track plus 1. For example, if Applicants' method sets the track ID for the (j)th second track, such as second track 420, to 3 in step 322, then in step 324 Applicants' method sets the track ID for the (j+1)th second track, such as second track 430, to 4. Applicants' method further in step 324 sets the track ID for the (j+2)th second track to the track ID for the (j)th second track plus 2. In the above example, step 324 includes setting the track ID for second track 440 to 5.

Applicants' method transitions from step 324 to step 326 wherein the method forms (R) target bitmaps using the source bitmap provided in step 312. In certain embodiments, step 326 is performed by a controller disposed in the source system, such as controller 220 (FIG. 2). In certain embodiments, step 326 is performed by a controller disposed in the target system, such as controller 240 (FIG. 2). In certain embodiments, step 326 is performed by a controller disposed in a host computer, such as controller 392 (FIG. 2).

Figure 5A:
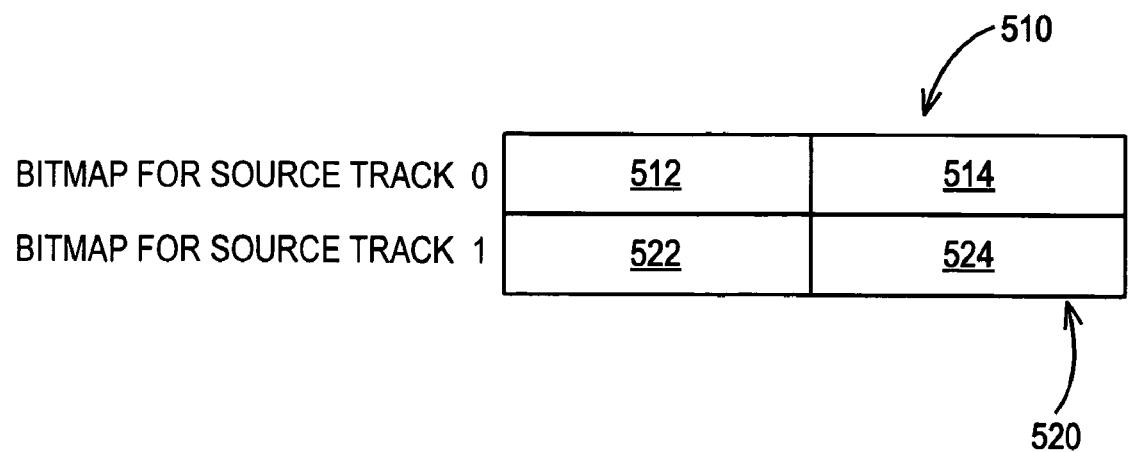
FIG. 5A is a block diagram showing bitmaps for two source tracks.
Figure 5B:
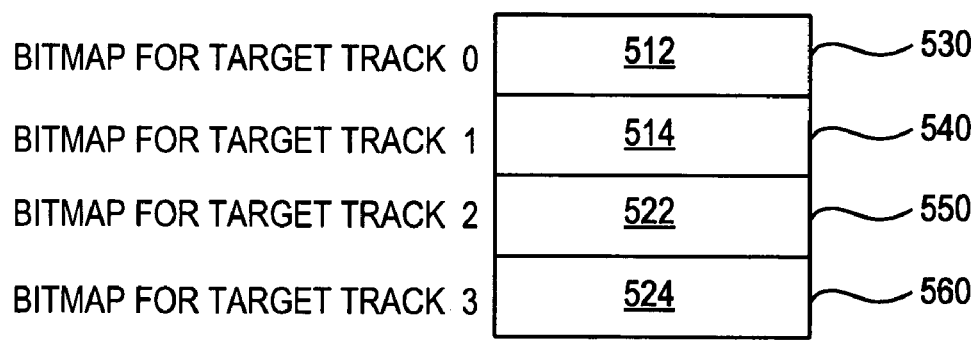
FIG. 5B is a block diagram showing the bitmaps of FIG. 5A being used to form target bitmaps for four target tracks.

For example if the source track size is 64 sectors and the target track size is 32 sectors, then in step 306 Applicants' method calculates (R) to be 2. Referring to FIG. 5A, if source track 0, and source track 1, both comprises 64 sectors, then bitmap 510 for source track 0 comprises 64 bits, where bitmap portion 512 comprises the first 32 bits, and bitmap portion 514 comprises the second 32 bits. Similarly, bitmap 520 for source track 1 comprises 64 bits, where bitmap portion 522 comprises the first 32 bits, and bitmap portion 524 comprises the second 32 bits.

In step 326, Applicants' method forms 2 target bitmaps, namely target bitmaps 530 and 540, from source bitmap 510, wherein target bitmap 530 comprises first bits 512, and wherein target bitmap 540 comprises second bits 514. In a subsequent iteration of the method, Applicants' method forms 2 target bitmaps, namely target bitmaps 550 and 560, from source bitmap 520, wherein target bitmap 550 comprises first bits 522, and wherein target bitmap 550 comprises second bits 524.

Applicants' method transitions from step 326 to step 328 wherein the method determines if additional first tracks comprising the selected I/O request, i.e. the earliest received I/O request, remain to be copied. In certain embodiments, step 328 is performed by a controller disposed in the source system, such as controller 220 (FIG. 2). In certain embodiments, step 328 is performed by a controller disposed in the target system, such as controller 240 (FIG. 2). In certain embodiments, step 328 is performed by a controller disposed in a host computer, such as controller 392 (FIG. 2).

If Applicants' method determines in step 328 that additional first tracks comprising the selected I/O operation remain to be copied, then the method transitions from step 328 to step 330 wherein the method sets (i) equal to (i)+1. In certain embodiments, step 330 is performed by a controller disposed in the source system, such as controller 220 (FIG. 2). In certain embodiments, step 330 is performed by a controller disposed in the target system, such as controller 240 (FIG. 2). In certain embodiments, step 330 is performed by a controller disposed in a host computer, such as controller 392 (FIG. 2).

Applicants' method transitions from step 330 to step 332 wherein the method sets (j) equal to (j)+R. In certain embodiments, step 335 is performed by a controller disposed in the source system, such as controller 220 (FIG. 2). In certain embodiments, step 335 is performed by a controller disposed in the target system, such as controller 240 (FIG. 2). In certain embodiments, step 335 is performed by a controller disposed in a host computer, such as controller 392 (FIG. 2).

Applicants' method transitions from step 332 to step 312 and continues as described herein. If Applicants' method determines in step 328 that no additional first tracks remain to be copied, then Applicants' method transitions from step 328 to step 334 wherein the method determines in there are one or more I/O requests enqueued. In certain embodiments, step 334 is performed by a controller disposed in the source system, such as controller 220 (FIG. 2). In certain embodiments, step 334 is performed by a controller disposed in the target system, such as controller 240 (FIG. 2). In certain embodiments, step 334 is performed by a controller disposed in a host computer, such as controller 392 (FIG. 2).

If Applicants' method determines in step 334 that there are additional I/O requests pending, then the method transitions from step 334 to step 336 wherein the method sets (k) equal to (k)+1. In certain embodiments, step 336 is performed by a controller disposed in the source system, such as controller 220 (FIG. 2). In certain embodiments, step 336 is performed by a controller disposed in the target system, such as controller 240 (FIG. 2). In certain embodiments, step 336 is performed by a controller disposed in a host computer, such as controller 392 (FIG. 2). Applicants' method transitions from step 336 to step 310 and continues as described herein. If Applicants' method determines in step 334 that no additional I/O requests are enqueued, then the method transitions from step 334 to step 338 and ends.

Figure 3E:
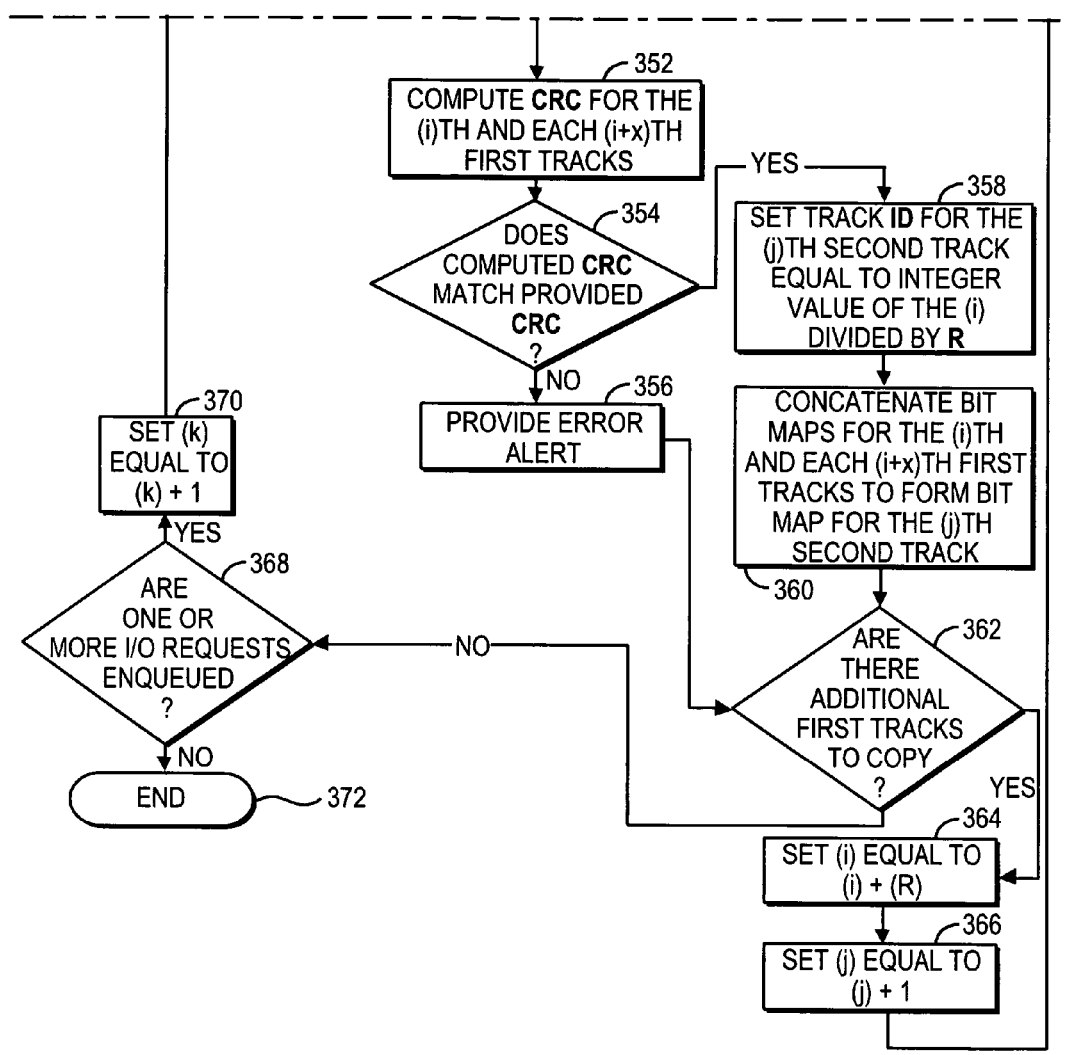

Referring to FIGS. 3A, 3D, and 3E, if Applicants' method determines in step 305 (FIG. 3A) that the source track size is not greater than the target track size, then the method transitions from step 305 to step 340 (FIG. 3C) wherein the method sets a ratio R equal to the target track size divided by the source track size. For example, if the source track size if 64 sectors, and the target track size is 128 sectors, then R is set in step 306 to 2. If the source track size if 32 sectors, and the target track size is 128 sectors, then R is set in step 306 to 4.

In step 342, Applicants' method initializes certain variables (i), (j), and (k) to 0. In certain embodiments, step 342 is performed by a controller disposed in the source system, such as controller 220 (FIG. 2). In certain embodiments, step 342 is performed by a controller disposed in the target system, such as controller 240 (FIG. 2). In certain embodiments, step 342 is performed by a controller disposed in a host computer, such as controller 392 (FIG. 2).

In certain embodiments, Applicants' method comprises setting a maximum number of transfer bytes. In certain embodiments, Applicants' source system, such as system 210 (FIG. 1) comprises a 2-byte track counter. In certain embodiments, such a 2-byte track counter allows a maximum of 64k-1 bytes of transfer. In step 344, Applicants' method sets a maximum number of transfer bytes. In certain embodiments, Applicants' method sets in step 344 the maximum number of transfer bytes to 64k-1.

In step 345, Applicants' method selects the (k)th I/O request, where that (k)th I/O request comprises one or more first tracks. In certain embodiments, step 345 is performed by a controller disposed in the source system, such as controller 220 (FIG. 2). In certain embodiments, step 345 is performed by a controller disposed in the target system, such as controller 240 (FIG. 2). In certain embodiments, step 345 is performed by a controller disposed in a host computer, such as controller 392 (FIG. 2).

In step 346, Applicants' method selects (R) first tracks from the selected I/O request, starting with the (i)th first track. Further in step 346, Applicants' method selects the (j)th second track. In certain embodiments, step 346 is performed by a controller disposed in the source system, such as controller 220 (FIG. 2). In certain embodiments, step 346 is performed by a controller disposed in the target system, such as controller 240 (FIG. 2). In certain embodiments, step 346 is performed by a controller disposed in a host computer, such as controller 392 (FIG. 2).

In step 347, Applicants' method determines if any of the selected (R) first tracks comprise more than the maximum number of transfer bytes. In certain embodiments, step 347 is performed by a controller disposed in the source system, such as controller 220 (FIG. 2). In certain embodiments, step 347 is performed by a controller disposed in the target system, such as controller 240 (FIG. 2). In certain embodiments, step 347 is performed by a controller disposed in a host computer, such as controller 392 (FIG. 2).

If Applicants' method determines in step 347 that one or more of the selected first tracks comprise more than the maximum number of transfer bytes, then the method transitions from step 347 to step 349 wherein the method divides those one or more first tracks exceeding the maximum number of transfer bytes into multiple transfers, and provides with each transfer CRC information for the sectors comprising that transfer. In certain embodiments, step 349 is performed by a controller disposed in the source system, such as controller 220 (FIG. 2). In certain embodiments, step 349 is performed by a controller disposed in the target system, such as controller 240 (FIG. 2). In certain embodiments, step 349 is performed by a controller disposed in a host computer, such as controller 392 (FIG. 2). Applicants' method transitions from step 348 to step 350 (FIG. 3D).

If Applicants' method determines in step 347 that one or more of the selected first tracks do not comprise more than the maximum number of transfer bytes, then the method transitions from step 347 to step 348 wherein the method provides to the target system the one or more first tracks that do not exceed the maximum number of transfer bytes, and CRC information for those first tracks. In certain embodiments, step 348 is performed by a controller disposed in the source system, such as controller 220 (FIG. 2). In certain embodiments, step 348 is performed by a controller disposed in the target system, such as controller 240 (FIG. 2). In certain embodiments, step 348 is performed by a controller disposed in a host computer, such as controller 392 (FIG. 2). Applicants' method transitions from step 348 to step 350.

Applicants' method transitions from steps 348 or 349 to step 350 wherein the method maps the (i)th first track and each (i+x)th first tracks onto the (j)th second track. In certain embodiments, step 350 is performed by a controller disposed in the source system, such as controller 220 (FIG. 2). In certain embodiments, step 350 is performed by a controller disposed in the target system, such as controller 240 (FIG. 2). In certain embodiments, step 350 is performed by a controller disposed in a host computer, such as controller 392 (FIG. 2). Applicants' method transitions from step 348 to step 350.

Figure 6:
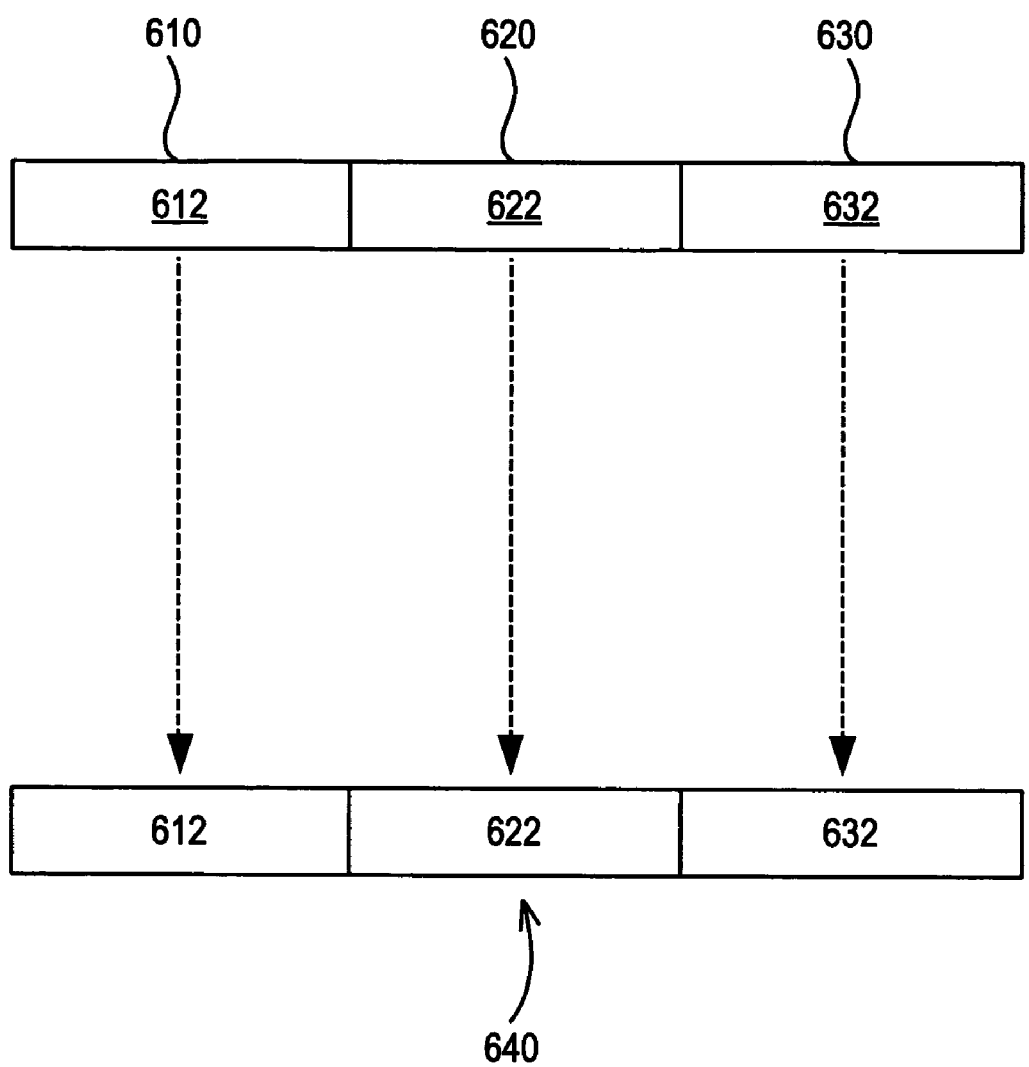
FIG. 6 is a block diagram showing three source tracks being mapped into one target track.

Referring now to FIG. 6, in step 350 Applicants' method maps first track 610 comprising sectors 612, first track 620 comprising sectors 614, and first track 630 comprising sectors 632, onto second track 640. Second track 640 comprises sectors 612, 622, and 632.

Applicants' method transitions from step 350 to step 352 (FIG. 3E) wherein the method computes CRC information for the (i)th first track and each (i+x)th first tracks. In certain embodiments, step 352 is performed by a controller disposed in the source system, such as controller 220 (FIG. 2). In certain embodiments, step 352 is performed by a controller disposed in the target system, such as controller 240 (FIG. 2). In certain embodiments, step 352 is performed by a controller disposed in a host computer, such as controller 392 (FIG. 2).

Referring now to FIG. 3E, in step 354 Applicants' method determines if the computed CRC information of step 352 matches the provided CRC information of step 348 or step 349. In certain embodiments, step 354 is performed by a controller disposed in the source system, such as controller 220 (FIG. 2). In certain embodiments, step 354 is performed by a controller disposed in the target system, such as controller 240 (FIG. 2). In certain embodiments, step 354 is performed by a controller disposed in a host computer, such as controller 392 (FIG. 2).

If Applicants' method determines in step 354 that the computed CRC information of step 352 does not match the provided CRC information of step 348 or step 349, then the method transitions from step 354 to step 356 wherein the method provides an error alert. Applicants' method transitions from step 356 to step 362.

In certain embodiments, the error alert of step 356 comprises a visual indication. In certain embodiments, the error alert of step 356 comprises a written indication. In certain embodiments, the error alert of step 356 comprises an auditory indication. In certain embodiments, step 356 is performed by a controller disposed in the source system, such as controller 220 (FIG. 2). In certain embodiments, step 356 is performed by a controller disposed in the target system, such as controller 240 (FIG. 2). In certain embodiments, step 356 is performed by a controller disposed in a host computer, such as controller 392 (FIG. 2).

If Applicants' method determines in step 354 that the computed CRC information of step 352 does match the provided CRC information of step 348 or 349, then the method transitions from step 354 to step 358 wherein the method set the track ID for the (j)th second track equal to (i) divided by (R). For example, if the (i)th first track comprises a track ID of 0, and if (R) is 3, then in step 358 Applicants' method sets the track ID for the (j)th second track to 0. If the (i)th first track comprises a track ID of 3, and if (R) is 3, then in step 358 Applicants' method sets the track ID for the (j)th second track to 1. In certain embodiments, step 358 is performed by a controller disposed in the source system, such as controller 220 (FIG. 2). In certain embodiments, step 358 is performed by a controller disposed in the target system, such as controller 240 (FIG. 2). In certain embodiments, step 358 is performed by a controller disposed in a host computer, such as controller 392 (FIG. 2).

Figure 7A:
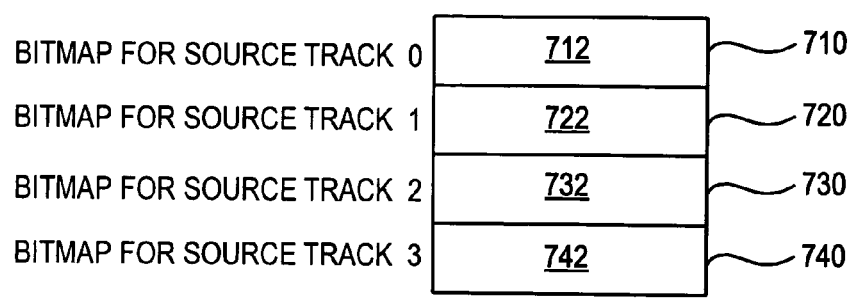
FIG. 7A is a block diagram showing bitmaps for four source tracks.

Applicants' method transitions from step 358 to step 360 wherein the method concatenates into one target bitmap the maps for the (i)th first and each (i+x)th first tracks comprising the (j)th second track. For example and referring to FIG. 7A wherein (R) is 2, source bitmap 710 for source track 0 comprises bits 712. Source bitmap 720 for source track 1 comprises bits 722. similarly, source bitmap 730 for source track 1 comprises bits 732. Source bitmap 740 for source track 3 comprises bits 742.

Figure 7B:
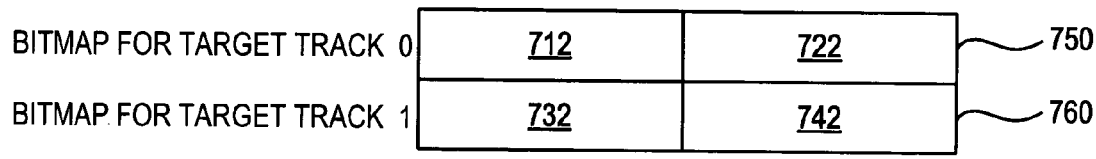
FIG. 7B is a block diagram showing the bitmaps of FIG. 5A being used to form target for two target tracks.

Referring now to FIG. 7B, in step 360 Applicants' method forms target bitmap 750 for target track 0, wherein bitmap 750 comprises bits 712 and bits 722. Similarly, in a subsequent iteration of Applicants' method, in step 360 Applicants' method forms target bitmap 760 for target track 1, wherein bitmap 760 comprises bits 732 and bits 742.

In certain embodiments, step 360 is performed by a controller disposed in the source system, such as controller 220 (FIG. 2). In certain embodiments, step 360 is performed by a controller disposed in the target system, such as controller 240 (FIG. 2). In certain embodiments, step 360 is performed by a controller disposed in a host computer, such as controller 392 (FIG. 2).

Applicants' method transitions from step 360 to step 362 wherein the method determines if additional first tracks comprising the selected I/O operation remain to be copied. In certain embodiments, step 362 is performed by a controller disposed in the source system, such as controller 220 (FIG. 2). In certain embodiments, step 362 is performed by a controller disposed in the target system, such as controller 240 (FIG. 2). In certain embodiments, step 362 is performed by a controller disposed in a host computer, such as controller 392 (FIG. 2).

If Applicants' method determines in step 362 that additional first tracks comprising the selected I/O operation remain to be copied, then the method transitions from step 362 to step 364 wherein the method sets (i) equal to (i)+(R). In certain embodiments, step 364 is performed by a controller disposed in the source system, such as controller 220 (FIG. 2). In certain embodiments, step 364 is performed by a controller disposed in the target system, such as controller 240 (FIG. 2). In certain embodiments, step 364 is performed by a controller disposed in a host computer, such as controller 392 (FIG. 2).

Applicants' method transitions from step 364 to step 366 wherein the method sets (j) equal to (j)+1. In certain embodiments, step 366 is performed by a controller disposed in the source system, such as controller 220 (FIG. 2). In certain embodiments, step 366 is performed by a controller disposed in the target system, such as controller 240 (FIG. 2). In certain embodiments, step 366 is performed by a controller disposed in a host computer, such as controller 392 (FIG. 2). Applicants' method transitions from step 366 to step 346 (FIG. 3D) and continues as described herein.

If Applicants' method determines in step 362 that no additional first tracks remain to be copied, then the method transitions from step 362 to step 368 wherein the method determines if one or more I/O requests are enqueued in the source system. In certain embodiments, step 368 is performed by a controller disposed in the source system, such as controller 220 (FIG. 2). In certain embodiments, step 368 is performed by a controller disposed in the target system, such as controller 240 (FIG. 2). In certain embodiments, step 368 is performed by a controller disposed in a host computer, such as controller 392 (FIG. 2).

If Applicants' method determines in step 368 that one or more I/O requests are enqueued in the source system, then the method transitions from step 368 to step 370 wherein the method sets (k) equal to (k)+1. In certain embodiments, step 370 is performed by a controller disposed in the source system, such as controller 220 (FIG. 2). In certain embodiments, step 370 is performed by a controller disposed in the target system, such as controller 240 (FIG. 2). In certain embodiments, step 370 is performed by a controller disposed in a host computer, such as controller 392 (FIG. 2). Applicants' method transitions from step 370 to step 345 (FIG. 3D) and continues as described herein.

If Applicants' method determines in step 368 that no I/O requests are enqueued in the source system, then the method transitions from step 368 to step 372 and ends.

In certain embodiments, individual steps recited in FIG. 3A, and/or FIG. 3B, and/or FIG. 3C, may be combined, eliminated, or reordered.

In certain embodiments, Applicants' invention includes instructions residing in the memory, such as memory 133 (FIG. 1), and/or memory 143, and/or memory 396, where those instructions are executed by a processor, such as processor 132 (FIG. 1), and/or processor 142 (FIG. 1), and/or processor 392, to perform steps 303, 304, and 305, recited in FIG. 3A, and/or steps 306, 308, 310, 311, 312, 314, 316, 318, 320, 322, 324, 326, 328, 329, 330, 332, 334, 336, and/or 338, recited in FIG. 3B, and/or steps 340, 342, 344, 345, 346, 347, 348, 349, 350, 352, 354, 356, 358, 360, 362, 363, 364, 366, 368, 370, and/or 372, recited in FIG. 3C.

In other embodiments, Applicants' invention includes instructions residing in any other computer program product, where those instructions are executed by a computer external to, or internal to, information storage and retrieval system 210 and/or 220, to perform steps 303, 304, and 305, recited in FIG. 3A, and/or steps 306, 308, 310, 311, 312, 314, 316, 318, 320, 322, 324, 326, 328, 329, 330, 332, 334, 336, and/or 338, recited in FIG. 3B, and/or steps 340, 342, 344, 345, 346, 347, 348, 349, 350, 352, 354, 356, 358, 360, 362, 363, 364, 366, 368, 370, and/or 372, recited in FIG. 3C. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to transfer information from a first information storage and retrieval system to a second information storage and retrieval system, comprising the steps of:
  providing a first information storage and retrieval system comprising a first track size and a plurality of first tracks, and a second information storage and retrieval system comprising a second track size and a plurality of second tracks;

determining if said first track size is greater than said second track size;
operative if said first track size is greater than said second track size:
setting a ratio (R) equal to said first track size divided by said second track size;
providing an (i)th first track;
providing (R) second tracks;
mapping said (i)th first track onto said (R) second tracks, wherein said (R) second tracks comprises the (j)th second track and each (j+x)th second track, wherein x is greater than or equal to 1 and less than or equal to (R−1)
setting the track ID for a (j)th second track equal to (i) * (R); and
setting the track ID for a (j+x)th second track equal to [(i) * (R)]+x.

2. The method of claim 1, further comprising the steps of:
determining source CRC information for said (i)th first track;
providing said source CRC information to said target information storage and retrieval system;
determining target system CRC information for said (j)th second track and each (j+x)th second track;
determining if said source CRC information matches said target system CRC information;
operative if said source CRC information does not match said target system CRC information, providing an error alert.

3. The method of claim 2, further comprising the steps of:
dividing the (i)th first segment into (R) segments;
determining source CRC information for each of said (R) segments.

4. The method of claim 1, further comprising the steps of:
providing a source bitmap;
forming (R) target bitmaps using said source bitmap, wherein each target bitmap indicates the modified sectors disposed within the associated target track.

5. The method of claim 1, if said first track size is not greater than said second track size, further comprising the steps of:
setting a ratio (R) equal to said second track size divided by said first track size;
providing (R) first tracks comprising;
providing the (j)th second track;
mapping said (R) first tracks onto said (j)th second track.

6. The method of claim 5, wherein said (R) first tracks comprise the (i)th first track and each (i+x)th first track, wherein x is greater than or equal to 1 and less than or equal to (R−1), said method further comprising the step of setting the track ID for said (j)th second track equal to (i) / (R).

7. The method of claim 5, further comprising the steps of:
determining source CRC information for said (R) first tracks;
providing said source CRC information to said target information storage and retrieval system;
determining target system CRC information for said (j)th second track;
determining if said source CRC information matches said target system CRC information;
operative if said source CRC information does not match said target system CRC information, providing an error alert.

8. The method of claim 5, further comprising the steps of:
setting a maximum number of transfer bytes;
determining if any of said (R) first tracks comprises more than said maximum number of transfer bytes;
operative if any of said (R) first tracks comprises more than said maximum number of transfer bytes, dividing each of those first tracks comprising more than said maximum number of transfer bytes into two or more segments, wherein each of those two or more segments comprises fewer than said maximum number of transfer bytes;
providing each of said two or more segments to said target information storage and retrieval system.

9. The method of claim 5, further comprising the steps of:
providing (R) source bitmaps;
forming a target bitmap comprising said (R) source bitmaps.

10. An article of manufacture comprising an information storage medium having computer readable program code disposed therein to transfer information from a first information storage and retrieval system comprising a first track size and a plurality of first tracks to a second information storage and retrieval system comprising a second track size and a plurality of second tracks, the computer readable program code comprising a series of computer readable program steps to effect:
determining if said first track size is greater than said second track size;
operative if said first track size is greater than said second track size:
setting a ratio (R) equal to said first track size divided by said second track size;
providing an (i)th first track;
providing (R) second tracks;
mapping said (i)th first track onto said (R) second tracks, wherein said (R) second tracks comprises the (j)th second track and each (j+x)th second track, wherein x is greater than or equal to 1 and less than or equal to (R−1)
setting the track ID for a (j)th second track equal to (i) * (R); and
setting the track ID for a (j+x)th second track equal to [(i) * (R)]+x.

11. The article of manufacture of claim 10, said computer readable program code further comprising a series of computer readable program steps to effect:
determining source CRC information for said (i)th first track;
providing said source CRC information to said target information storage and retrieval system;
determining target system CRC information for said (j)th second track and each (j+x)th second track;
determining if said source CRC information matches said target system CRC information;
operative if said source CRC information does not match said target system CRC information, providing an error alert.

12. The article of manufacture of claim 11, said computer readable program code further comprising a series of computer readable program steps to effect:
dividing the (i)th first segment into (R) segments;
determining source CRC information for each of said (R) segments.

13. The article of manufacture of claim 10, said computer readable program code further comprising a series of computer readable program steps to effect:
receiving a source bitmap;
forming (R) target bitmaps using said source bitmap, wherein each target bitmap indicates the modified sectors disposed within the associated target track.

14. The article of manufacture of claim 10, said computer readable program code further comprising a series of computer readable program steps to effect if said first track size is not greater than said second track size, further comprising the steps of:

setting a ratio (R) equal to said second track size divided by said first track size;
providing (R) first tracks comprising;
providing the (j)th second track;
mapping said (R) first tracks onto said (j)th second track.

15. The article of manufacture of claim 14, wherein said (R) first tracks comprise the (i)th first track and each (i+x)th first track, wherein x is greater than or equal to 1 and less than or equal to (R−1 ), said computer readable program code further comprising a series of computer readable program steps to effect setting the track ID for said (j)th second track equal to (i) / (R).

16. The article of manufacture of claim 14, said computer readable program code further comprising a series of computer readable program steps to effect:

determining source CRC information for said (R) first tracks;
providing said source CRC information to said target information storage and retrieval system;
determining target system CRC information for said (j)th second track;
determining if said source CRC information matches said target system CRC information;
operative if said source CRC information does not match said target system CRC information, providing an error alert.

17. The article of manufacture of claim 14, said computer readable program code further comprising a series of computer readable program steps to effect:

obtaining a predetermined maximum number of transfer bytes;
determining if any of said (R) first tracks comprises more than said maximum number of transfer bytes;
operative if any of said (R) first tracks comprises more than said maximum number of transfer bytes, dividing those first tracks comprising more than said maximum number of transfer bytes into two or more segments, wherein each of those two or more segments comprises fewer than said maximum number of transfer bytes;
providing each of said two or more segments to said target information storage and retrieval system.

18. The article of manufacture of claim 14, said computer readable program code further comprising a series of computer readable program steps to effect:

receiving (R) source bitmaps;
forming a target bitmap comprising said (R) source bitmaps.

19. A computer program product embodied in a information storage medium and usable with a programmable computer processor transfer information from a first information storage and retrieval system comprising a first track size and a plurality of first tracks to a second information storage and retrieval system comprising a second track size and a plurality of second tracks, comprising:

computer readable program code which causes said programmable computer processor to determine if said first track size is greater than said second track size;
computer readable program code which, if said first track size is greater than said second track size, causes said programmable computer processor to:
set a ratio (R) equal to said first track size divided by said second track size;
map an (i)th first track onto (R) second tracks, wherein said (R) second tracks comprises the (j)th second track and each (j+x)th second track, wherein x is greater than or equal to 1 and less than or equal to (R−1 );
computer readable program code which causes said programmable computer processor to set the track ID for said (j)th second track equal to (i) * (R); and
computer readable program code which causes said programmable computer processor to set the track ID for the (j+x)th second track equal to [(i)* (R)]+x.

20. The computer program product of claim 19, further comprising:

computer readable program code which causes said programmable computer processor to receive source CRC information for said (i)th first track;
computer readable program code which causes said programmable computer processor to calculate target system CRC information for said (j)th second track and each (j+x)th second track;
computer readable program code which causes said programmable computer processor to determine if said source CRC information matches said target system CRC information;
computer readable program code which, if said source CRC information does not match said target system CRC information, causes said programmable computer processor to provide an error alert.

21. The computer program product of claim 20, further comprising:

computer readable program code which causes said programmable computer processor to split the (i)th first segment into (R) segments;
computer readable program code which causes said programmable computer processor to determine source CRC information for each of said (R) segments.

22. The computer program product of claim 19, further comprising:

computer readable program code which causes said programmable computer processor to receive a source bitmap;
computer readable program code which causes said programmable computer processor to form (R) target bitmaps using said source bitmap, wherein each target bitmap indicates the modified sectors disposed within the associated target track.

23. The computer program product of claim 19, further comprising:

computer readable program code which, if said first track size is not greater than said second track size, causes said programmable computer processor to:
set a ratio (R) equal to said second track size divided by said first track size;
receive (R) first tracks;
provide the (j)th second track;
map said (R) first tracks onto said (j)th second track.

24. The computer program product of claim 23, wherein said (R) first tracks comprise the (i)th first track and each (i+x)th first track, wherein x is greater than or equal to 1 and less than or equal to (R−1 ), further comprising computer readable program code which causes said programmable computer processor to set the track ID for said (j)th second track equal to (i) / (R).

25. The computer program product of claim 23, further comprising:

computer readable program code which causes said programmable computer processor to receive source CRC information for said (R) first tracks;

computer readable program code which causes said programmable computer processor to calculate target system CRC information for said (j)th second track;

computer readable program code which causes said programmable computer processor to determine if said source CRC information matches said target system CRC information;

computer readable program code which, if said source CRC information does not match said target system CRC information, causes said programmable computer processor to provide an error alert.

26. The computer program product of claim 23, further comprising:

computer readable program code which causes said programmable computer processor to obtain a predetermined maximum number of transfer bytes;

computer readable program code which causes said programmable computer processor to determine if any of said (R) first tracks comprises more than said maximum number of transfer bytes;

computer readable program code which, for each of (R) first tracks comprising more than said maximum number of transfer bytes, causes said programmable computer processor to split those first tracks comprising more than said maximum number of transfer bytes into two or more segments, wherein each of those two or more segments comprises fewer than said maximum number of transfer bytes;

computer readable program code which causes said programmable computer processor to provide each of said two or more segments to said target information storage and retrieval system.

27. The computer program product of claim 23, further comprising:

computer readable program code which causes said programmable computer processor to receive (R) source bitmaps;

computer readable program code which causes said programmable computer processor to form a target bitmap comprising said (R) source bitmaps.

* * * * *